United States Patent Office 3,413,332
Patented Nov. 26, 1968

3,413,332
CONDENSATION OF POLYCHLOROOLEFINS
WITH CARBOXYLIC ACID ESTERS
Louis Schmerling, Riverside, Ill., assignor to Universal Oil Products Company, Des Plaines, Ill., a corporation of Delaware
No Drawing. Filed Jan. 2, 1964, Ser. No. 335,423
20 Claims. (Cl. 260—468)

ABSTRACT OF THE DISCLOSURE

Condensation of certain polychloroolefins, such as tetrachloroethylene, with certain carboxylic acid esters, such as isopentyl acetate, at about 50–300° C. in the presence of organic peroxide or other free radical generating compound.

This invention relates to a free radical induced condensation reaction between a polychoroolefin and a carboxylic acid ester. In one of its broad aspects, the present invention embodies a method of effecting a polychloroolefin carboxylic acid ester condensation reaction which comprises forming a mixture of a polychloroolefin, an ester of a carboxylic acid, and a free radical generating compound and reacting the polychloroolefin with the ester by heating the said mixture at a temperature of from about 50° C. to about 300° C. and at least as high as the decomposition temperature of the free radical generating compound, the aforesaid polychloroolefin having at least one chlorine atom attached to each of the doubly-bonded carbon atoms, and the foresaid ester containing at least one hydrogen atom selected from the group consisting of a hydrogen atom attached to a carbon atom in alpha position to the bivalent carbonyloxy group and a hydrogen atom attached to a tertiary carbon atom.

Another embodiment of this invention concerns a method of effecting a polychloroalkene carboxylic acid ester condensation reaction which comprises forming a mixture of a polychloroalkene, an alkyl ester of a carboxylic acid, and a peroxy compound and reacting the polychloroalkene with the ester by heating said mixture at a temperature of from about 50° C. to about 300° C. and at least as high as the decomposition temperature of the peroxy compound, the aforesaid polychloroalkene having at least one chlorine atom attached to each of the doubly-bonded carbon atoms, and the aforesaid ester containing at least one hydrogen atom selected from the group consisting of a hydrogen atom attached to a carbon atom in alpha position to the bivalent carbonyloxy group and a hydrogen atom attached to a tertiary carbon atom.

Still another embodiment relates to a method of effecting a polychloroethylene carboxylic acid ester condensation reaction which comprises forming a mixture of a polychloroethylene, an alkyl ester of an alkanoic acid, and an organic peroxide and reacting the polychloroethylene with the ester by heating said mixture at a temperature of from about 50° C. to about 300° C. and at least as high as the decomposition temperature of the organic peroxide, the aforesaid polychloroethylene having at least one chlorine atom attached to each of the doubly-bonded carbon atoms, and the aforesaid ester containing at least one hydrogen atom selected from the group consisting of a hydrogen atom attached to a carbon atom in alpha position to the bivalent carbonyloxy group and a hydrogen atom attached to a tertiary carbon atom.

Other, and more specific embodiments of this invention will become apparent in the following detailed specification.

Carboxylic acid esters condensable with polychloroolefins in accordance with the method of this invention are those containing at least one hydrogen atom attached to a carbon atom selected from the group consisting of a tertiary carbon atom and carbon atoms which are in alpha position, or immediately adjacent to, the carbonyloxy group of the said carboxylic acid ester. Thus, considering an ester as the condensation product of an acid and an alcohol, esters containing a hydrogen atom attached to a tertiary carbon atom of either the acid or alcohol portion of the ester are condensable with polychloroolefins pursuant to the method of this invention as are those esters containing at least one hydrogen atom attached to a carbon atom of either the acid or alcohol portion of the ester which is in a position alpha to the carbonyloxy group. Suitable esters of carboxylic acids include alkyl esters of alkanoic acids, for example, methyl acetate, ethyl acetate, propyl acetate, isopropyl acetate, butyl acetate, isobutyl acetate, sec-butyl acetate, pentyl acetate, isopentyl acetate, hexyl acetate, 1-methyl-1-pentyl acetate, 2-methyl-1-pentyl acetate, 3-methyl-1-pentyl acetate, 4-methyl-1-pentyl acetate, heptyl acetate, 1-methyl-1-hexyl acetate, 2-methyl-1-hexyl acetate, 3-methyl-1-hexyl acetate, 4-methyl-1-hexyl acetate, 5-methyl-1-hexyl acetate, octyl acetate, 1-methyl-1-heptyl acetate, 2-methyl-1-heptyl acetate, 3-methyl-1-heptyl acetate, 4-methyl-1-heptyl acetate, 5-methyl-1-heptyl acetate, 6-methyl-1-heptyl acetate, nonyl acetate, 1-methyl-1-octyl acetate, 2-methyl-1-octyl acetate, 3-methyl-1-octyl acetate, 4-methyl-1-octyl acetate, 5-methyl-1-octyl acetate, 6-methyl-1-octyl acetate, 7-methyl-1-octyl acetate, decyl acetate, 8-methyl-1-nonylacetate, undecyl acetate, 9-methyl-1-decyl acetate, dodecyl acetate, 10-methyl-1-undecyl acetate, etc., as well as the corresponding propionates, butyrates, isobutyrates, and both branched and straight-chain pentanoates, hexanoates, heptanoates, octanoates, nonanoates, decanoates, laurates, and stearates, etc., and also cycloalkyl esters of alkanoic acids, for example, cyclopentyl acetate, 3-methylcyclopentyl acetate, cyclohexyl acetate, 2-methylcyclohexyl acetate, 3-methylcyclohexyl acetate, 4-methylcyclohexyl acetate, cycloheptyl acetate, cyclopentyl propionate, cyclohexyl propionate, cyclopentyl butyrate, cyclopentyl isobutyrate, cyclohexyl butyrate, cyclohexyl isobutyrate, cyclopentyl pentanoate, cyclohexyl pentanoate, cyclohexyl isopentanoate, etc. Suitable esters further include alkyl esters of cycloalkanoic and cycloalkylalkanoic acids like methyl cyclopentanecarboxylate, ethyl cyclopentanecarboxylate, propyl cyclopentanecarboxylate, isopropyl cyclopentanecarboxylate butyl cyclopentanecarboxylate, isobutyl cyclopentanecarboxylate, pentyl cyclopentanecarboxylate, isopentyl cyclopentanecarboxylate, methyl 3-methylcyclopentanecarboxylate, methyl cyclopentaneacetate, methyl cyclopentanepropionate, methyl cyclohexanecarboxylate, methyl 4 - methylcyclohexanecarboxylate, methyl cyclohexaneacetate, methyl cyclohexanepropionate, etc., as well as cycloalkyl esters of cycloalkanoic and cycloalkylalkanoic acids, for example cyclopentyl cyclopentanecarboxylate, cyclohexyl cyclohexanecarboxylate, cyclopentyl 3 - methylcyclopentanecarboxylate, cyclopentyl cyclopentaneacetate, cyclohexyl 4-methylcyclohexanecarboxylate, cyclohexyl cyclohexaneacetate, cyclohexyl cyclopentanecarboxylate, etc. Other carboxylic acid esters such as alkyl esters of aromatic acids, for example, methyl benzoate, ethyl benzoate, and the like, are also condensable with polychloroolefins in the manner herein contemplated although not necessarily with the same or equivalent results.

The polychloroolefins which may be reacted with an ester in the presence of a free radical generating compound in accordance with the method of this invention comprise polychloroolefins having at least one chlorine atom attached to each of the doubly-bonded carbon atoms. As is readily observed, this type of configuration still leaves one valence of each of the doubly-bonded carbon atoms free, and these free valences may be taken up by substituents such as hydrogen atoms, halogen atoms including fluorine, chlorine, and bromine, and alkyl groups such as methyl, ethyl, propyl, etc., or a halo-alkyl group such as a fluoromethyl group, chloromethyl group, bromomethyl group, dichloromethyl group, chloroethyl group, trifluoromethyl group, etc., or an aryl group. A preferred species of these polychloroolefins comprises polychloroethylenes, in which each of the doubly-bonded carbon atoms has at least one chlorine atom attached thereto. Examples of suitable polychloroolefins include 1,2-dichloroethylene, trichloroethylene, 1-fluoro-1,2-dichloroethylene, 1-bromo-1,2-dichloroethylene, tetrachloroethylene, 1,2-difluoro-1,2-dichloroethylene, 1,2-dibromo-1,2-dichloroethylene, 1 - fluoro - 2 - bromo - 1,2 - dichloroethylene, 1,2-dichloro-1-propene, 1,1,2-trichloro-1-propene, 1,1,2,3-tetrachloro-1-propene, 1,2,3-trichloro-1-propene, 1,2,3,3-tetrachloro-1-propene, 1,2,3,3,3-pentachloro-1-propene, 1-fluoro-1,2-dichloro-1-propene, 1,2-difluoro-1,2-dichloro-1-propene, 3-fluoro-1,2-dichloro-1-propene, 1,3,3-trifluoro-1,2-dichloro-1-propene, 3,3,3-trifluoro-1,2-dichloro-1-propene, 1,2-dichloro-1,3-difluoro-1-propene, 1-bromo-1,2-dichloro-propene, 3,3-dibromo-1,2-dichloro-1-propene, 3-bromo-1,2-dichloro-1-propene, 1,3-dibromo-1,2-dichloro-1-propene, 3,3,3-tribromo-1,2-dichloro-1-propene, 1,3,3-tribromo - 1,2-dichloro-1-propene, 1,2-dichloro-1-butene, 2,3-dichloro-2-butene, 1,2-dichloro-3-methyl-1-butene, 1,1,2-trichloro-1-butene, 1,2,3-trichloro-1-butene, 1,1,2,3-tetrachloro - 1 - butene, 1,1,1-trifluoro-2,3-dichloro-2-butene, 1,2,3,3-tetrachloro-1-butene 1,1,2-trichloro-3-methyl-1-butene, 1,2-dichloro-1-pentene, 2,3-dichloro-2-pentene 1,2-dichloro-1-hexene, 2,3-dichloro-2-hexene, 3,4-dichloro-3-hexene, 1,2-dichloro-1-heptene, 1,2-dichloro-1-octene, 1,2-dichloro-1-nonene, 1,2-dichloro-1-decene, etc. It is essential that the polychloroolefins contain at least two chlorine atoms per molecule since monochloroolefins do not give a condensation reaction of the type herein described. Similarily, polychloroolefins other than the polychloroolefins containing at least one chlorine atom on each of the doubly-bonded carbon atoms do not give reactions of the type described herein. For example, 1,2-dibromoethylene as well as tribromoethylene are inoperative in the method of the present invention. As set forth hereinabove, polychloroolefins such as 3,3,3-trifluoro-1,2-dichloro-1-propene that contain one or more fluorine atoms may be used in this method since the fluorine atoms in such compounds do not noticeably affect the activity of the chlorine atoms. Likewise, one or more fluorine atoms may be attached to the doubly-bonded carbon atoms provided that the abovementioned requirement for chlorine atoms attached to the doubly-bonded carbon atoms is met.

The ester and the polychloroolefin are reacted in contact with a free radical generating compound which acts to initiate or catalyze the condensation reaction at the reaction conditions. Suitable free radical generating compounds include peroxy compounds containing the bivalent radical —O—O— which decompose to form free radicals and initiate the condensation reaction. Examples of such free radical generating compounds include the persulfates, perborates, and percarbonates of ammonium and of the alkali metals. Organic peroxy compounds constitute a preferred class of peroxy compounds and include peracetic acid, persuccinic acid, dimethyl peroxide, diethyl peroxide, diisopropyl peroxide, di-t-butyl peroxide, acetyl peroxide, butyryl peroxide, lauroyl peroxide, benzoyl peroxide, 2-4-dichlorobenzoyl peroxide, tetralin peroxide, urea peroxide, t-butyl perbenzoate, t-butyl hydroperoxide, methylcyclohexyl hydroperoxide, diisopropylbenzoyl hydroperoxide, cumene hydroperoxide, methyl ethyl ketone peroxide, cyclohexanone peroxide, etc., the dialkyl and diacyl peroxides being particularly preferred. Mixtures of peroxy compounds may be employed as catalysts, or said peroxy compounds may be utilized in admixture with various diluents. Thus, commercially available organic peroxy compounds compounded with various diluents, including benzoyl peroxide composited with calcium sulfate, benzoyl peroxide compounded with camphor, etc., may be utilized. Only catalytic amounts (less than stoichiometric amounts) need be used in the process.

The present process is effected at a temperature at least as high as the initial decomposition temperature of the particular free radical generating compound employed. Free radical generating compounds such as peroxy compounds, particularly organic peroxides, decompose at a measureable rate with time in a logarithmic function dependent upon temperature. This rate of decomposition is ordinarily expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction temperature is selected at which the free radical generating compound will decompose with the generation of sufficient free radicals to initial the condensation reaction and at which temperature the half life of said compound is such as to cause the reaction to proceed smoothly at a suitable rate. When the half life of the free radical generating compound is greater than 10 hours, radicals are not generated at a sufficient rate to cause the contemplated reaction to go forward at a satisfactory rate. Thus, the reaction temperature may be within the range of from about 50° C. to about 300° C. and at least as high as the decomposition temperature of the free radical generating compound, by which is meant a temperature such that the half life of the free radical generating compound is usually not greater than 10 hours. Since the half life for each free radical generating compound is different at different temperatures, the exact temperature to be utilized in a particular reaction will vary. However, persons skilled in the art are well acquainted with the half life vs. temperature data for different free radical generating compounds. Thus it is within the skill of one familiar with the art to select the particular temperature needed for any particular initiator. However, the operating temperature generally should not exceed the decomposition temperature of the free radical generating compound by substantially more than about 150° C. since the free radical generating compounds herein described decompose rapidly under such high temperature conditions. For example, the half life of t-butyl perbenzoate is less than 10 hours at 110° C., and therefore when this peroxy compound is used, the reaction temperature is from about 110° C. to about 300° C., but generally lower than about 265° C. A reaction temperature of from about 130° C. to about 280° C. is suitable when the peroxy compound is di-t-butyl peroxide, and of from about 75° C. to about 300° C., but generally not in excess of about 225° C., with benzoyl peroxide. Higher reaction temperatures may be employed, but little advantage is gained if the temperature is in excess of the decomposition temperature of the free radical generating compound by more about 150° C. as hereinbefore mentioned.

The reaction conditions herein utilized relate principally to temperature. Although it may be desirable to employ superatmospheric pressures of up to about 100 atmospheres or more, for example to maintain the reactants in a liquid phase during the course of the reaction, pressure is not considered to be an important variable in relation to the herein described condensation reaction and in many cases may be simply autogenous pressure developed during the course of the reaction. In batch type operations it is often desirable to seal the reaction mixture in a closed vessel and to pressure the vessel to 10, or 30 or 50 or more atmospheres with an inert gas such as nitrogen to insure that the reactants and free radical generating compound remain in contact during the course of the reaction.

The concentration of the free radical generating compound may vary over a rather wide range. However, a relatively low concentration, say from about 0.1 wt. percent to about 10 wt. percent based on the weight of the polychloroolefin, will effectively promote the condensation reaction. The reaction time may be from less than 1 minute to several hours, depending on the temperature of the reaction and upon the half life of the particular free radical generating compound utilized. Generally speaking, contact times of at least 10 minutes are preferred.

The condensation reaction of a polychloroolefin containing at least one chlorine atom attached to each of the doubly-bonded carbon atoms with a carboxylic acid ester containing at least one hydrogen atom in alpha position to the carbonyloxy group is illustrated by the following equation showing condensation of 1,2-dichloroethylene with ethyl propionate which contains two carbon atoms in alpha position to the carbonyloxy group that have hydrogen atoms attached thereto; and the isomeric condensation products resulting therefrom:

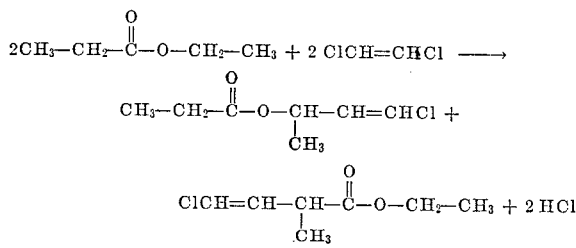

The equation

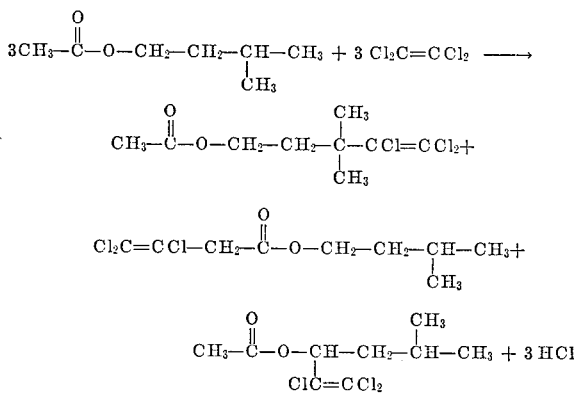

showing condensation of 1,1,2,2-tetrachloroethylene with isopentyl acetate (which contains a hydrogen atom attached to a tertiary carbon atom as well as hydrogen atoms attached to carbon atoms alpha to the carbonyloxy group) is illustrative of condensation reactions of a polychloroolefin herein described with a carboxylic acid ester containing hydrogen atoms attached to a tertiary carbon atom and to each of the carbon atoms alpha to the carbonyloxy group.

The halo-substituted olefinic esters recovered as reaction products of the novel condensation reaction herein contemplated are in many instances new compositions of matter. They undergo many reactions of chloroolefins as well as esters. The products are condensable with dienes, cycloalkadienes, or polychloroalkadienes such as hexachlorocyclopentadiene to form further new compositions of matter useful in the preparation of polymers, pharmaceuticals, and diverse organic chemicals. For example, 3-chloro-1-methylallyl propionate, a condensation product of 1,2-dichloroethylene and ethyl propionate, may be reacted with hexachlorocyclopentadiene in the familiar Diels-Alder type reaction to form the chlorinated bicycloheptene, 1-(1,3,4,5,6,7,7-heptachlorobicyclo[2.2.1]-5-hetpen-2-yl)ethyl propionate, with unique insecticidal properties. Alternatively the chlorinated product may be condensed with a conjugated dienic hydrocarbon such as butadiene or cyclopentadiene and the reaction product may be condensed with hexachlorocyclopentadiene to yield an insecticidal compound.

The condensation reaction of this invention involves the evolution of hydrogen chloride. Where it is desirable to avoid radical changes in pH during the course of the reaction, small amounts of the materials which have a buffering effect on the pH may be included in the reaction mixture. For example, an alkaline pH can be maintained by the use of buffers such as borax, disodium phosphate, sodium carbonate, ammonium carbonate, sodium acetate, etc.

The method of the present invention may be effected in any suitable manner and may comprise a batch or a continuous type of operation. In the case of a batch type of operation, a quantity of starting materials comprising an ester, a polychloroolefin, and a free radical generating compound, is charged to a suitable reaction vessel and heated therein at a preselected reaction temperature. The reaction vessel may be a closed vessel or it may be an open vessel with an overhead reflux condenser. The vessel should in either case be provided with heating means as well as mixing means to insure adequate contact of reactants and the free radical generating compound. At the expiration of a suitable reaction period, the vessel contents are cooled to about room temperature, treated with dilute alkali, water-washed and dried. The dried reaction product is recovered from the unreacted starting materials by conventional means, for example by fractional distillation.

The product of this invention may be prepared in a continuous type of process wherein the reactants and the free radical generating compound are charged in a continuous stream to a reactor maintained at the proper conditions of temperature and pressure. The reactor may be an unpacked vessel or coil, or it may contain an adsorbent packing material such as fire brick, alumina, dehydrated bauxite, and the like. The reaction mixture is continuously withdrawn from the reactor at a rate which will insure adequate residence time therein. The product is separated from the reactor effluent and unreacted starting materials are recycled for further use as a portion of the feed material.

The following examples are presented to further illustrate the process of this invention. Said examples are for the purpose of illustration only and are not intended as a limitation in any manner on the generally broad scope of this invention.

Example I

This example illustrates the addition of a polychloroolefin to a carboxylic acid ester containing a tertiary carbon atom as well as carbon atoms in alpha position to the carbonyloxy group to which hydrogen atoms are attached. Seventy grams of tetrachloroethylene, 100 grams of isopentyl acetate, and 8 grams of di-t-butyl peroxide are placed in a glass liner and sealed in a rotating autoclave of about 850 cubic centimeters capacity. The autoclave is initially pressured to about 30 atmospheres with nitrogen and then heated at a temperature of 130–140° C. over a period of approximately 4.5 hours. Thereafter, the autoclave is cooled to about room temperature, depressured, and a dark amber liquid product is recovered therefrom. This reaction product is neutralized with aqueous potassium carbonate and distilled from anhydrous potassium carbonate at a reduced pressure. Three isomeric condensation products are recovered due to reaction not only at the tertiary carbon atom of the alkyl portion of the ester, but also at the alpha carbon atoms of both the alkyl portion and the acid portion. The products recovered are 4,5,5-trichloro-3,3-dimethyl-4-pentenyl acetate, 1-(trichlorovinyl)-3-methylbutyl acetate, and isopentyl 3,4,4-trichloro-3-butenoate.

Example II

Trichloroethylene condenses with ethyl propionate in the presence of di-t-butyl peroxide at each of the carbon atoms alpha to the carbonyloxy group to form two isomeric condensation products, ethyl 4,4-dichloro-2-methyl-3-butenoate and 3,3-dichloro-1-methylallyl propionate. This condensation reaction is carried out by charging 50 grams of trichloroethylene, 102 grams of ethyl propionate, and 8 grams of di-t-butyl peroxide to a glass liner of a rotating autoclave which is then sealed and pressured to about 30 atm. with nitrogen. The autoclave is heated and maintained at a temperature of 130–140° C. over a 4 hour period. After cooling and depressuring the autoclave, the contents are neutralized with aqueous potassium carbonate, dried, and distilled over anhydrous potassium carbonate at reduced pressure for recovery of the condensation products.

Example III

At reaction conditions substantially as described in Example II, 65 grams of tetrachloroethylene and 102 grams of ethyl propionate are heated together with 8 grams of di-t-butyl peroxide. The dark amber liquid product is treated with aqueous potassium carbonate and distilled over anhydrous potassium carbonate at reduced pressure to yield the condensation products, ethyl 3,4,4-trichloro - 2 - methyl-3-butenoate, and 2,3,3-trichloro-1-methylallyl propionate, addition being at the carbon atoms alpha to the carbonyloxy group as in the previous example.

Example IV

The condensation of 1,2-dichloroethylene with ethyl cyclohexanate is effected by heating about 156 grams of ethyl cyclohexanonate, 96 grams of the dichloroethylene, and 8 grams of benzoyl peroxide together at a temperature of 150–160° C. under about 30 atmospheres initial nitrogen pressure utilizing a glass lined rotating autoclave in the manner described above. After a reaction period of about 4.5 hours, the reaction product is recovered, washed with dilute potassium carbonate, dried, and distilled over anhydrous potassium carbonate at reduced pressure. The principal condensation product is 4-chloro-3-butenyl cyclohexanoate.

I claim as my invention:

1. A method of effecting a polychloroolefin carboxylic acid ester condensation reaction which comprises forming a mixture of a polychloroolefin, an alkyl or cycloalkyl ester of a hydrocarbyl carboxylic acid, and a free radical generating compound and reacting the polychloroolefin with the ester by heating said mixture at a temperature of from about 50° C. to about 300° C. and at least as high as the decomposition temperature of the free radical generating compound, the aforesaid polychloroolefin having at least one chlorine atom attached to each of the doubly-bonded carbon atoms, and the aforesaid ester containing at least one hydrogen atom selected from the group consisting of a hydrogen atom attached to a carbon atom in alpha position to the bivalent carbonyloxy group and a hydrogen atom attached to a tertiary carbon atom.

2. The method of claim 1 further characterized in that the said ester of a carboxylic acid is an alkyl ester of a carboxylic acid.

3. The method of claim 1 further characterized in that the said ester of a carboxylic acid is a cycloalkyl ester of a carboxylic acid.

4. The method of claim 1 further characterized in that said carboxylic acid is an alkanoic acid.

5. The method of claim 1 further characterized in that the said ester of a carboxylic acid in an alkyl ester of an alkanoic acid.

6. The method of claim 1 further characterized in that the said ester of a carboxylic acid is a cycloalkyl ester of an alkanoic acid.

7. The method of claim 1 further characterized in that said carboxylic acid is a cycloalkanoic acid.

8. The method of claim 1 further charatcerized in that the said ester of a carboxylic acid is an alkyl ester of a cycloalkanoic acid.

9. The method of claim 1 further characterized in that the said ester of a carboxylic acid is a cycloalkyl ester of a cycloalkanoic acid.

10. A method of effecting a polychloroalkene carboxylic acid ester condensation reaction which comprises forming a mixture of a polychloroalkene, an alkyl or cyloalkyl ester of a hydrocarbyl carboxylic acid, and a peroxy compound and reacting the polychloroalkene with the ester by heating said mixture at a temperature of from about 50° C. to about 300° C. and at least as high as the decomposiiton temperature of the peroxy compound, the aforesaid polychloroalkene having at least one chlorine atom attached to each of the doubly-bonded carbon atoms, and the aforesaid ester containing at least one hydrogen atom selected from the group consisting of a hydrogen atom attached to a carbon atom in alpha position to the bivalent carbonyloxy group and a hydrogen atom attached to a tertiary carbon atom.

11. The method of claim 10 further characterized in that the said ester of a carboxylic acid is an alkyl ester of a carboxylic acid.

12. The method of claim 10 further characterized in that said carboxylic acid is an alkanoic acid.

13. The method of claim 10 further characterized in that the said ester of a carboxylic acid is an alkyl ester of an alkanoic acid.

14. A method of effecting a polychloroethylene carboxylic acid ester condensation reaction which comprises forming a mixture of a polychloroethylene, an alkyl ester of a carboxylic acid, and an organic peroxide and reacting the polychloroethylene with the ester by heating said mixture at a temperature of from about 50° C. to about 300° C. and at least as high as the decomposition temperature of the organic peroxide, the aforesaid polychloroethylene having at least one chlorine atom attached to each of the doubly-bonded carbon atoms, and the aforesaid ester containing at least one hydrogen atom selected from the group consisting of a hydrogen atom attached to a carbon atom in alpha position to the bivalent carbonyloxy group and a hydrogen atom attached to a tertiary carbon atom.

15. A method of claim 14 further characterized in that the said alkyl ester of a carboxylic acid is an alkyl ester of an alkanoic acid.

16. A method of effecting the condensation of trichloroethylene with isopentyl acetate which comprises forming a mixture of trichloroethylene, isopentyl acetate, and di-t-butyl peroxide and reacting the trichloroethylene with the isopentyl acetate by heating the said mixture at a temperature of from about 130° C. to about 300° C.

17. A method of effecting the condensation of tetrachloroethylene with isopentyl acetate which comprises forming a mixture of tetrachloroethylene, isopentyl acetate, and di-t-butyl peroxide and reacting the tetrachloroethylene with the isopentyl acetate by heating the said mixture at a temperature of from about 130° C. to about 300° C.

18. A method of effecting the condensation of 1,2-dichloroethylene with ethyl propionate which comprises forming a mixture of 1,2-dichloroethylene ethyl propionate, and di-t-butyl peroxide and reacting the ethyl propionate with the dichloroethylene by heating the said mixture at a temperature of from about 130° C. to about 300° C.

19. A method of effecting the condensation of tetrachloroethylene with ethyl propionate which comprises forming a mixture of tetrachloroethylene, ethyl propionate, and di-t-butyl peroxide and reacting the tetrachloroethylene with the ethyl propionate by heating the said mixture at a temperature of from about 130° C. to about 300° C.

20. A method of effecting the condensation of 1,2-dichloroethylene with ethyl chlorohexanoate which comprises forming a mixture of 1,2-dichloroethylene, ethyl cyclohexanoate, and benzoyl peroxide and reacting the dichloroethylene with the ethyl cyclohexanoate by heating the said mixture at a temperature of from about 75° C. to about 225° C.

References Cited

Schmerling et al.: "J. Am. Chem. Soc.," vol. 71, (1949), pp. 2015–2019.

Brown et al.: "J. Am. Chem. Soc.," vol. 77, (1955), pp. 4019–4024.

Patmore et al.: "J. Org. Chem.," vol. 27 (1962), pp. 4106–4200.

LORRAINE A. WEINBERGER, *Primary Examiner.*

P. J. KILLOS, *Assistant Examiner.*